US 9,614,976 B2

(12) United States Patent
Joffe et al.

(10) Patent No.: US 9,614,976 B2
(45) Date of Patent: Apr. 4, 2017

(54) SYSTEMS AND METHODS FOR POWERING NETWORK ACCESS DEVICES FROM CUSTOMER PREMISES EQUIPMENT

(75) Inventors: Daniel M. Joffe, Owens Crossroads, AL (US); Jared D. Cress, Decatur, AL (US)

(73) Assignee: ADTRAN, Inc., Huntsville, AL (US)

( * ) Notice: Subject to any disclaimer, the term of this patent is extended or adjusted under 35 U.S.C. 154(b) by 225 days.

(21) Appl. No.: 13/437,700

(22) Filed: Apr. 2, 2012

(65) Prior Publication Data

US 2012/0250840 A1    Oct. 4, 2012

Related U.S. Application Data

(60) Provisional application No. 61/470,859, filed on Apr. 1, 2011.

(51) Int. Cl.
| | |
|---|---|
| *H04M 11/06* | (2006.01) |
| *H04M 19/00* | (2006.01) |
| *H04L 12/28* | (2006.01) |

(52) U.S. Cl.
CPC ....... *H04M 11/062* (2013.01); *H04L 12/2878* (2013.01); *H04M 19/001* (2013.01)

(58) Field of Classification Search
USPC ....................................................... 379/9.01
See application file for complete search history.

(56) References Cited

U.S. PATENT DOCUMENTS

| 5,909,445 A | 6/1999 | Schneider |
| 6,272,209 B1 | 8/2001 | Bridger et al. |
| 6,546,089 B1 | 4/2003 | Chea, Jr. et al. |
| 6,647,024 B1 * | 11/2003 | Dombkowski ..... H04L 12/6418 370/352 |

(Continued)

FOREIGN PATENT DOCUMENTS

WO    WO 2012/117371    9/2012

OTHER PUBLICATIONS

Kevin W. Schneider, et al., U.S. Appl. No. 12/839,403, entitled, "Systems and Methods for Powering a Service Unit", filed Jul. 19, 2010.

(Continued)

*Primary Examiner* — Amal Zenati
(74) *Attorney, Agent, or Firm* — Maynard Cooper & Gale, P.C.; Jon Holland

(57) ABSTRACT

A communication system has a network access device (NAD) that is designed to deliver Plain Old Telephone Service (POTS) along with high-speed data to Customer Premises Equipment (CPE). The NAD is backpowered by the CPE across a subscriber line. When backpower is provided from the CPE, circuitry (referred to as a "POTS signaling element") within the network access device converts POTS control signaling to digital data for transmission to the CPE. The band vacated by the POTS control signaling is used for the power signal on the subscriber line. In the absence of backpower, components of the network access device are bypassed, thereby providing POTS in the event of a power failure. The NAD receives advance warning of the backpowering so that it can disable the bypassing in order to prevent the power signal from leaking through the NAD to the network.

43 Claims, 9 Drawing Sheets

(56) References Cited

U.S. PATENT DOCUMENTS

| | | | |
|---|---|---|---|
| 6,647,034 B1 * | 11/2003 | Smith | H01S 3/1083 |
| | | | 372/21 |
| 7,050,546 B1 | 5/2006 | Richardson et al. | |
| 7,245,583 B1 | 7/2007 | Renucci | |
| 8,411,696 B1 | 4/2013 | Ko et al. | |
| 8,761,370 B2 * | 6/2014 | Rawlins | H04Q 3/0079 |
| | | | 379/221.01 |
| 2002/0191546 A1 | 12/2002 | Chong | |
| 2003/0123648 A1 | 7/2003 | Ashton et al. | |
| 2003/0133437 A1 | 7/2003 | Richarson et al. | |
| 2004/0027992 A1 | 2/2004 | Volkening et al. | |
| 2009/0116622 A1 | 5/2009 | Campbell et al. | |
| 2010/0074312 A1 * | 3/2010 | Cioffi et al. | 375/222 |
| 2010/0142689 A1 * | 6/2010 | Hansen | H04B 3/50 |
| | | | 379/93.36 |

OTHER PUBLICATIONS

Kevin W. Schneider, et al., U.S. Appl. No. 12/839,402, entitled, "Communication Systems and Methods for Using Shared Channels to Increase Peak Data Rates", filed Jul. 19, 2010.

\* cited by examiner

SYSTEMS AND METHODS FOR POWERING NETWORK ACCESS DEVICES FROM CUSTOMER PREMISES EQUIPMENT

CROSS REFERENCE TO RELATED APPLICATION

This application claims priority to U.S. Provisional Patent Application No. 61/470,859, entitled "Reverse Powered DSLAM with Highly Compatible POTS" and filed on Apr. 1, 2011, which is incorporated herein by reference.

RELATED ART

In a telecommunication network, at least one subscriber line typically extends from a network facility, such as a central office to customer premises equipment (CPE). In the past, twisted-wire pairs composed of copper have been used extensively for the subscriber lines. However, more recently due to demands for increased data rates, much of the copper infrastructure is being replaced with optical fiber that permits much higher data rates.

In a fiber-to-the-home (FTTH) architecture, an optical fiber runs all of the way from the network facility to the customer premises, thereby providing a high data rate for the service being delivered. Unfortunately, construction costs make FTTH prohibitively expensive for many brownfield applications. In a fiber-to-the-cabinet (FTTC) architecture, an optical fiber runs from a network facility to an intermediate point, sometimes referred to as a primary connection point (PCP). In a fiber-to-the-distribution point (FTTDP) architecture, an optical fiber runs from a network facility to an intermediate point much closer to the customer, sometimes referred to as a distribution point (DP). In such architectures, a significant portion of the subscriber line is implemented via fiber, which permits a high data rate over a relatively long distance, and the existing copper infrastructure is leveraged to provide service over the usually shorter distance from the intermediate point to the customer premises. In fact, the intermediate point is often close enough to customers to allow high-speed data services, such as for example very-high-speed digital subscriber line, second generation (VDSL2), to be delivered over copper cables. In many cases, those data rates are high enough to be comparable to a gigabit passive optical network (GPON) such that performance close to an FTTH architecture is possible without having to extend fiber all of the way to the customer premises.

One of the significant problems with an FTTC or FTTDP architecture is that the components at the PCP or DP usually require active powering. The costs of supplying and maintaining power for the components at the PCP or DP limits the deployment of FTTC and FTTDP, particularly for rural environments where there are relatively few customers serviced by a given PCP or DP.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems for delivering telecommunication services across subscriber lines to equipment at one or more customer premises. In one exemplary embodiment, a communication system has a fiber-to-the-cabinet (FTTC) or fiber-to-the-distribution point (FTTDP) architecture that is deployable, cost effective, and fits into existing operations and maintenance (OAM) systems wherever possible. The system is designed to deliver plain old telephone service (POTS) along with high-speed data in a way that preserves the existing relationships with competitive providers. Such a system has a network access device, such as a digital subscriber line access multiplexer (DSLAM), that is backpowered by customer premises equipment (CPE) across a subscriber line. When backpower is provided from the CPE, circuitry (referred to herein as a "POTS signaling element") within the network access device converts POTS control signaling to digital data for transmission to the CPE. The band vacated by the POTS control signaling is used for the power signal on the subscriber line. In the absence of backpower, components of the network access device are bypassed, thereby providing POTS to the CPE in the event of a power failure. A protocol is defined to provide the network access device with advance warning of the backpowering so that it can disable the bypassing in order to prevent the power signal from leaking through the network access device to the network.

Figure 1:
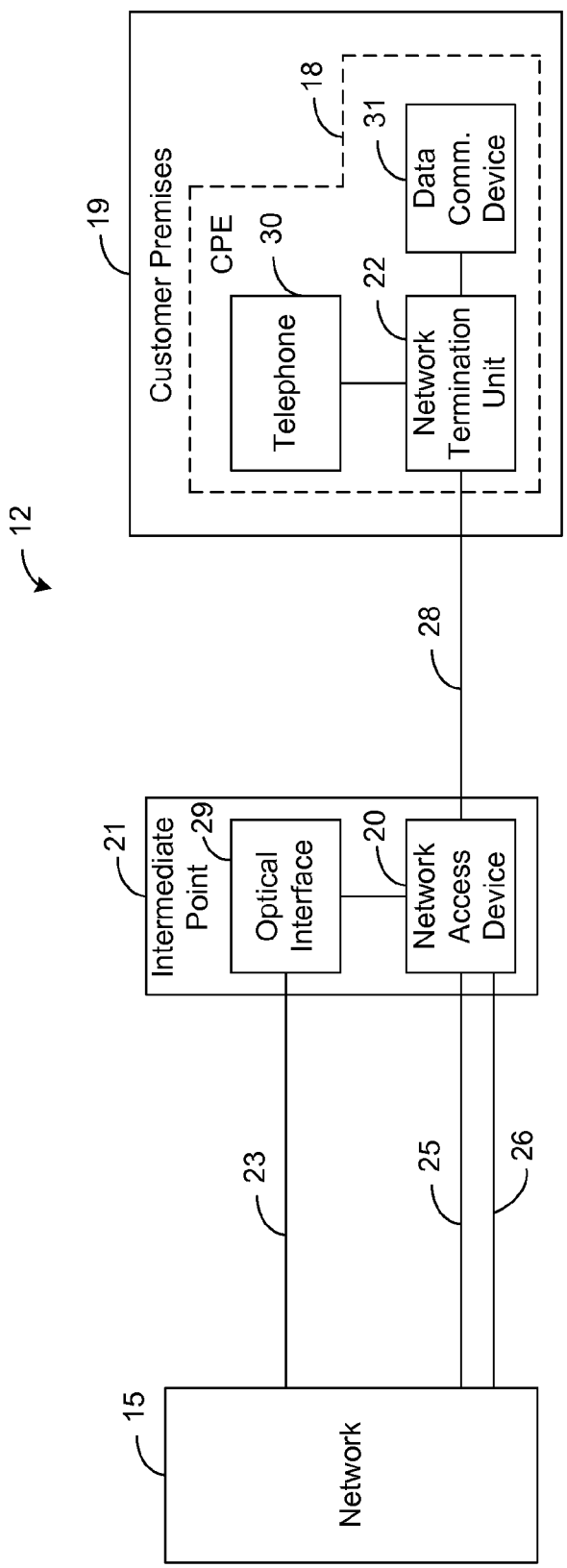
FIG. 1 is a block diagram illustrating an exemplary embodiment of a communication system.

FIG. 1 depicts an exemplary embodiment of a communication system 12 having a network 15 coupled to customer premises equipment (CPE) 18 at a customer premises 19 through a network access device 20, such as a digital subscriber line access multiplexer (DSLAM), located at an intermediate point 21 between the network 15 and the customer premises 19. In one exemplary embodiment, the system 12 implements an FTTC or FTTDP architecture depending on the location of the intermediate point 21 from the customer premises 19. However, the network access device 20 may reside at other locations in other architectures.

As shown by FIG. 1, the network 15 is coupled to the intermediate point 21 via an optical fiber 23 and a plurality of electrically conductive connections 25, 26, such as twisted-wire pairs. Further, the intermediate point 21 is coupled to the CPE 18 via at least one electrically conductive connection 28, such as a twisted-wire pair. The network access device 20 terminates an end of the connection 28, and the opposite end of the connection 28 is terminated by a network termination unit 22 of the CPE 18.

The optical fiber 23 carries a high-speed data stream. At least a portion of this high-speed data stream is transmitted from the network access device 20 to the CPE 18 via at least one connection 28. In this regard, the optical fiber 23 is coupled to an optical interface 29 that converts the optical signal received from the fiber 23 into at least one electrical signal. In particular, at least a portion of the data from the fiber 23 is transmitted to the network access device 20 via a digital data signal. The optical interface 29 may also be coupled to other network access devices (not shown in FIG. 1 for simplicity of illustration) servicing CPE (not shown in FIG. 1) of other customer premises (not shown in FIG. 1).

In one exemplary embodiment, data is communicated across the connection 28 at a high frequency (e.g., greater than about 25 kilo-Hertz (kHz)) via VDSL (e.g., VDSL2) for which discrete multi-tone (DMT) modulation is used to encode multiple carrier signals at different frequencies with digital data. However, other modulation formats and frequencies are possible in other embodiments. In addition, it is possible for the CPE 18 to be connected to the network access device 20 via multiple connections 28 such that a higher aggregate data rate between the network access device 20 and the network termination unit 22 is possible. As a mere example, bonding may be used to bond such multiple connections 28 between the CPE 18 and the network access device 20, but the use of multiple connections 28 and/or bonding is unnecessary.

The connection 25 extending between the network 15 and the network access device 20 carries POTS signals for the CPE 18, and such POTS signals are communicated at a relatively low frequency (e.g., between about 300 Hz to about 4 kHz). As shown by FIG. 1, the CPE 18 has at least one telephone 30 that generates POTS signals for transmission in the upstream direction, and in the downstream direction the telephone 30 receives POTS signals that are transmitted from the network 15 across the connection 25. The CPE 18 also has at least one data communication device 31, such as a computer or other device that communicates digital data. Data transmitted from the device 31 is transmitted across connection 28 and fiber 23 to the network 15, and data from the network 15 is transmitted across the fiber 23 and the connection 28 to the device 31.

In the downstream direction, the network access device 20 is configured to simultaneously transmit across the same connection 28 both data from the high-speed data stream received from the optical fiber 23 and the POTS signals received from the connection 25, as will be described in more detail hereafter. In the upstream direction, the network access device 20 receives both data and POTS signals from the CPE 18. The network access device 20 transmits such POTS signals across the connection 25 to the network 15, and the network access device 20 forwards the data from the CPE 18 to the optical interface 29, which transmits the data via an optical data signal across the fiber 23.

Note that POTS includes POTS control signaling, also referred to herein as "baseband POTS signaling", that occurs at frequencies well below 300 Hz, near DC. In one embodiment, the baseband POTS signaling in the downstream direction is converted to digital data at the intermediate point 21, and a narrowband carrier signal at a frequency (e.g., around 17 kHz) between the POTS band (e.g., above about 4 kHz) and the VDSL band (e.g., above about 25 kHz) is modulated with the digital data. Thus, the baseband POTS signaling is converted to a narrowband modulated data signal having a frequency around 17 kHz for transmission across the connection 28. At the CPE 18, the original baseband POTS signaling is re-created before being fed to the telephone 30 at the customer premises 19. That is, the narrowband modulated data signal is converted back into baseband POTS signaling for transmission from the network termination unit 22 to the telephone 30.

In the upstream direction, the baseband POTS signaling is similarly converted to digital data at the network termination unit 22 and carried by a narrowband modulated data signal, having a frequency for example around 14 kHz, to the intermediate point 21. Furthermore, the frequency range vacated by the POTS control signaling is used to provide a power signal from the CPE 18 to the network access device 20, thereby obviating the need to provide a separate power source at the intermediate point 21, as will be described in more detail hereafter.

Figure 2:
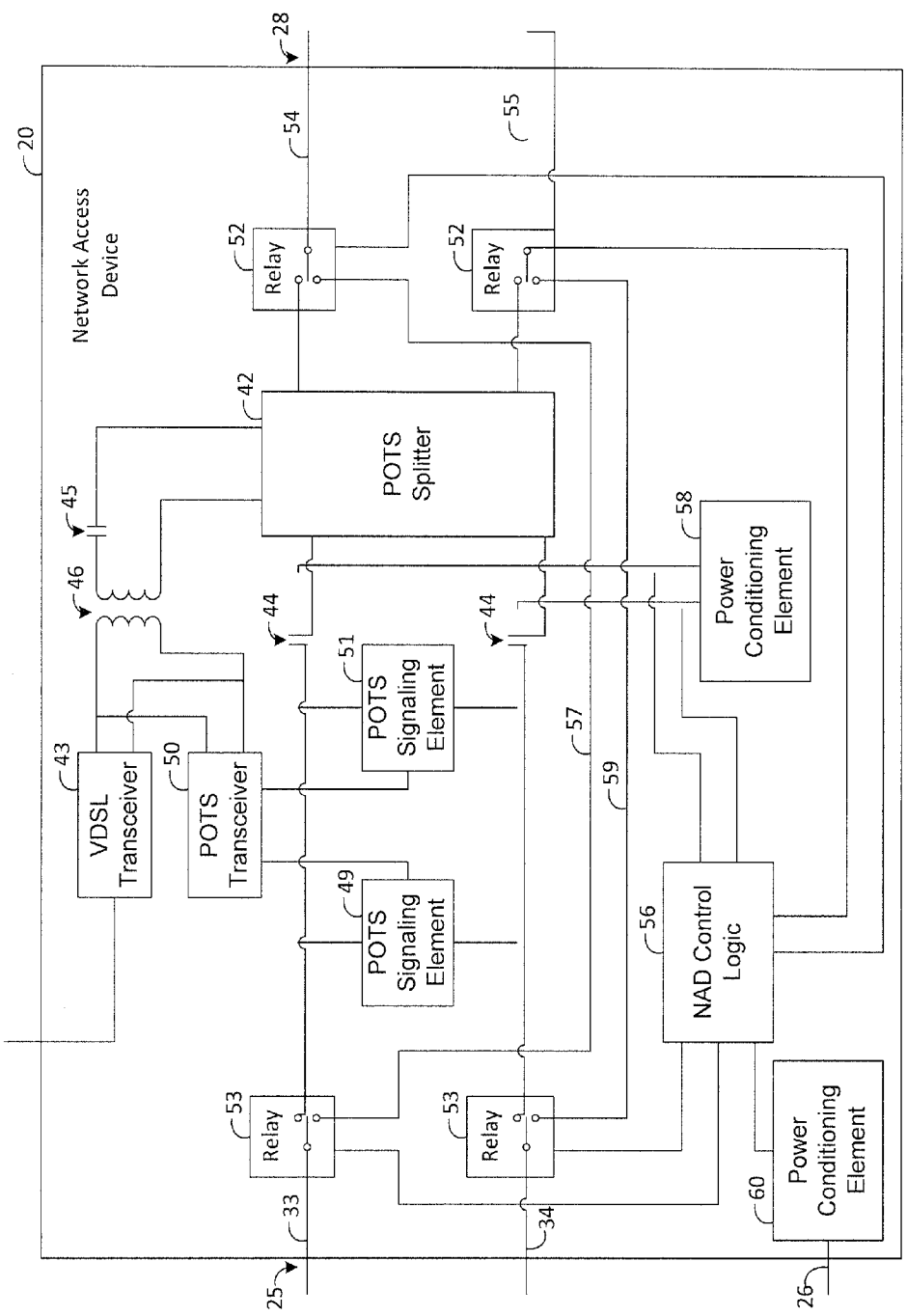
FIG. 2 is a block diagram illustrating an exemplary embodiment of a network access device, such as is depicted by FIG. 1.

FIG. 2 depicts an exemplary embodiment of the network access device 20. As shown by FIG. 2, the connection 25 carrying POTS signals between the intermediate point 21 and the network 15 (FIG. 1) is coupled to a POTS splitter 42 through a pair of capacitors 44 that separate POTS signaling on the connection 25 from the backpowering provided by the network termination unit 22, as will be described in more detail hereafter. Note that in the exemplary embodiment shown by FIG. 2, the connection 25 is a two-wire connection (e.g., a twisted-wire pair). One of the wires 33 of the connection 25 will be referred to hereafter as "tip," and the other wire 34 will be referred to hereafter as "ring."

As shown by FIG. 2, the network access device 20 has a transceiver 43, referred to hereafter as "VDSL transceiver," that is coupled to and receives data from the optical interface 29 (FIG. 1). The VDSL transceiver 43 is configured to modulate a plurality of carrier signals with the data received from the optical interface 29 to form VDSL signals (e.g., VDSL2) for transmission to the CPE 18. The VDSL transceiver 43 is also coupled to the POTS splitter 42 through a capacitor 45 and a transformer 46 as is suitable for transmission across the connection 28. In one exemplary embodiment, such VDSL signals have frequencies above about 25 kHz. However, in other embodiments, other types of transceivers, frequencies, and modulation formats may be used to transmit the data that is received from the fiber 23.

In the upstream direction, VDSL signals are received by the transceiver 43 from the connection 28. The transceiver 43 is configured to demodulate such signals to recover data that is transmitted to the optical interface 29 (FIG. 1), which transmits such data via an optical data signal across the fiber 23 to the network 15.

A downstream POTS signaling element 49 is coupled to tip 33 and ring 34. The downstream POTS signaling element 49 is configured to detect baseband POTS signaling from the connection 25 and convert such signaling into digital data, also referred to herein as "POTS control signaling data." As described above, the baseband POTS signaling is transmitted across the connection 25 near DC. As known in the art, baseband POTS signaling uses analog pulses or tones to convey various control information (e.g., call progress) about a POTS call.

The downstream POTS signaling element 49 transmits the POTS control signaling data to a transceiver 50, referred to hereafter as "POTS transceiver," that is configured to modulate a narrowband carrier signal with the POTS control signaling data received from the element 49. In one exemplary embodiment, the carrier signal has a frequency of about 17 kHz, sitting between the POTS and VDSL bands.

Figure 3:
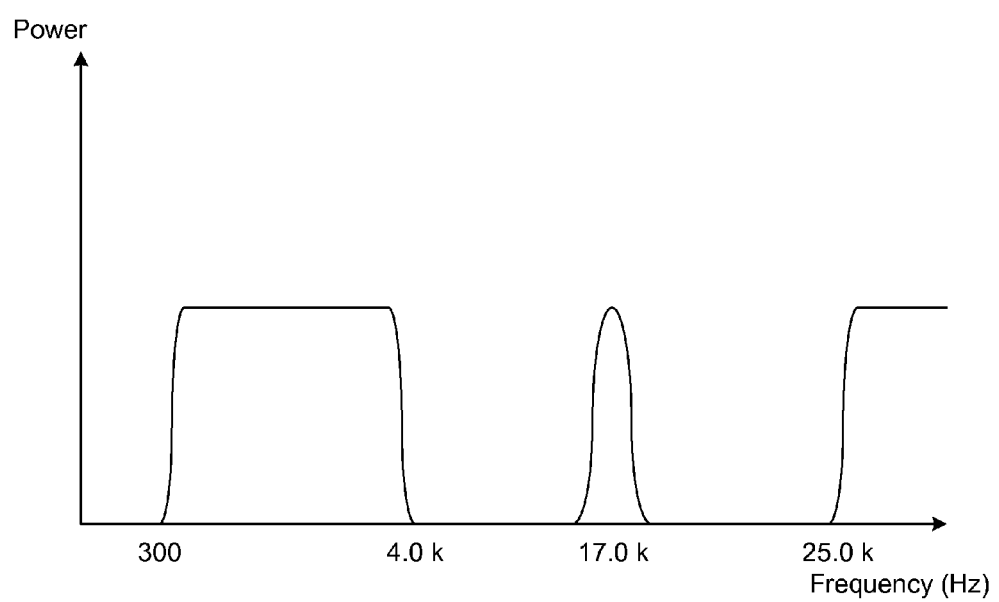
FIG. 3 is a graph illustrating power versus frequency for an exemplary embodiment of a communication system, such as is depicted by FIG. 1, when a network access device and network termination unit are operating in a non-bypass state.

In this regard, FIG. 3 depicts an exemplary graph of voltage versus frequency for the connection 28 in the downstream direction, noting that the amplitudes shown by FIG. 3 are not to scale. POTS signals from the network 15 pass through the POTS splitter 42 from the connection 25 to the connection 28, and such signals are communicated in a band from about 300 Hz to about 4 kHz, as shown by FIG. 3. Further, the POTS transceiver 50 is configured to transmit the POTS control signaling data across the connection 28 via a narrowband carrier signal having a frequency of about 17 kHz, as shown by FIG. 3. Further, the VDSL transceiver 43 transmits VDSL signals across the connection 28 at frequencies above about 25 kHz. Thus, as shown by FIG. 3, the baseband below about 300 Hz is vacated. As will be described in more detail hereafter, such baseband is used to transmit a power signal from the CPE 18 (FIG. 1) to the network access device 20, which uses such power signal to power the active components of the device 20.

Referring to FIG. 2, the POTS splitter 42 splits lower-frequency upstream signals, such as the power signal and the POTS signals between about 300 Hz and 4 kHz, from higher-frequency upstream signals, such as the VDSL signals and the 14 kHz signal that has been modulated with POTS control signaling data. Thus, the POTS signals between about 300 Hz and 4 kHz pass through the POTS splitter 42 to tip 33 and ring 34 of the connection 25. The power signal also passes through the POTS splitter 42, but the capacitors 44 substantially block further propagation of the power signal thereby preventing the power signal from propagating across the connection 25.

The higher-frequency upstream signals carried by the connection 28 are received by the transceivers 43, 50. As described above, the VDSL transceiver 43 is configured to demodulate the VDSL signals, and the POTS transceiver 50 is configured to demodulate the 14 kHz signal to recover the POTS control signaling data carried by such signal. The POTS transceiver 50 is configured to transmit such POTS control signaling data to an upstream POTS signaling element 51 that is coupled to tip 33 and ring 34 of the connection 25. The upstream POTS signaling element 51 is configured to use the POTS control signaling data to re-create the baseband POTS signaling from which such data was originally derived at the network termination unit 22. The upstream POTS signaling element 51 is also configured to transmit the baseband POTS signaling across the connection 25 to the network 15 (FIG. 1). As described above, such baseband POTS signaling is below 300 Hz near DC. Thus, the baseband POTS signaling is communicated near DC across the connection 25, but the information from such signaling is carried by higher frequency data signals across the connection 28, leaving the lower frequencies below 300 Hz available for power transmission.

In the exemplary embodiment shown by FIG. 2, the connection 28 is a two-wire connection (e.g., a twisted-wire pair). One of the wires 54 of the connection 28 will be referred to hereafter as "tip," and the other wire 55 of the connection 28 will be referred to hereafter as "ring."

The POTS splitter 42 is coupled to the connection 28 through a pair of relays 52 and to the connection 25 through a pair of relays 53. Specifically, one relay 53 is coupled to tip 33, and the other relay 53 is coupled to ring 34. As shown by FIG. 2, one of the relays 52 is coupled to tip 54, and the other relay 52 is coupled to ring 55. As will be described in more detail hereafter, the relays 52, 53 are coupled to and operate under the control of network access device (NAD) control logic 56 in order to selectively bypass components (e.g., POTS splitter 42, transceivers 43, 50, and POTS signaling elements 49, 51) of the network access element 20 depending on whether the network termination unit 22 is providing backpower to the network access device 20.

Each relay 53 electrically couples a respective wire of the connection 25 to either a path leading to the POTS splitter 42 or alternatively to a bypass path that bypasses the POTS splitter 42, as well as the POTS signaling elements 49, 51 and the transceivers 43, 50, depending on control input received from the NAD control logic 56. As an example, based on input from the NAD control logic 56, one of the relays 53 may electrically couple tip 33 of connection 25 to the POTS splitter 42 in which case the relay 53 electrically isolates tip 33 from a bypass connection 57 that extends from such relay 53 to a relay 52 that is coupled to tip 54 of the connection 28. Alternatively, the NAD control logic 56 may control this same relay 53 such that it electrically couples tip 33 of the connection 25 to the bypass connection 57 in which case the relay 53 electrically isolates tip 33 from the POTS splitter 42. Similarly, the NAD control logic 56 selectively controls the relay 53 coupled to ring 34 of the connection 25 such that ring 34 is electrically coupled to either the POTS splitter 42 or a bypass connection 59 but not both. The NAD control logic 56 also selectively controls the relay 52 coupled to tip 54 of the connection 28 such that tip 54 is electrically coupled to either the POTS splitter 42 or the bypass connection 57 but not both, and the NAD control logic 56 selectively controls the relay 52 coupled to ring 55 of the connection 28 such that ring 55 is electrically coupled to either the POTS splitter 42 or the bypass connection 59 but not both.

For purposes of illustration, a state in which a relay electrically couples a wire of connection 25 or 28 to the POTS splitter 42 and electrically isolates such wire from the bypass connection coupled to it shall be referred to herein as a "closed" position. Further, a state in which a relay electrically couples a wire of connection 25 or 28 to a bypass connection and electrically isolates such wire from the POTS splitter 42 shall be referred to herein as an "open" position.

In one exemplary embodiment, the NAD control logic 56 receives power from the network 15 via the connection 26 so that the NAD control logic 56 can remain operational when no backpower is being received from the CPE 18. As an example, the connection 26 may be dedicated for transmitting a power signal from the network 15 to the network access device 20 so that it is unnecessary to implement a separate power source (e.g., batteries) at the network access device 20 for powering the NAD control logic 56. In this regard, the connection 26 is coupled to a power conditioning element 60, which conditions the power signal from the connection 26 to provide a conditioned power signal that may be used to power the NAD control logic 56. As an example, the power conditioning element 60 may regulate the voltage of the conditioned power signal so that it remains within a range suitable for the components of the NAD control logic 56. However, it is possible for other techniques to be used for providing power to the NAD control logic 56, and it is possible for at least some data to be transmitted across the connection 26 in addition to the power signal.

In one exemplary embodiment, the NAD control logic 56 is implemented in hardware, such as a field programmable gate array (FPGA). However, it is possible for components of the NAD control logic 56 to be implemented in software, firmware, hardware, or any combination thereof. If at least a portion of the NAD control logic 56 is implemented in software or firmware, then the network access device 20 preferably comprises a processing element (not shown), such as a digital signal processor (DSP) or central processing unit (CPU), for executing instructions of the logic 56.

As shown by FIG. 2, a power conditioning element 58 is coupled to tip 33 and ring 34 at points between the capacitors 44 and the POTS splitter 42. When the network termination unit 22 is backpowering the network access device 20, a power signal is transmitted across the connection 28 at a low frequency below 300 Hz, such as near DC, from the network termination unit 22 to the network access device 20. Such power signal passes through the POTS splitter 42 and is received by the power conditioning element 58, which conditions the power signal to provide a conditioned power signal that may be used to power the active components of the network access device 20 and/or other components at the intermediate point 21. As an example, the power conditioning element 58 may regulate the voltage of the conditioned power signal so that it remains within a range suitable for the components being powered from such signal. Exemplary techniques for receiving a power signal from a customer premises and conditioning such power signal are described in commonly-assigned U.S. patent application Ser. No. 12/839,403, entitled "Systems and Methods for Powering a Service Unit," and filed on Jul. 19, 2010, which is incorporated herein by reference.

In one exemplary embodiment, the NAD control logic 56 monitors tip 54 and ring 55 to determine whether the network access device 20 is receiving a power signal from the network termination unit 22. Such determination may be based on a measurement of voltage and/or current of tip 54 and ring 55. As an example, the NAD control logic 56 may determine a parameter indicative of the received power and compare the value to a threshold to determine whether the power signal is being received. Commonly-assigned U.S. patent application Ser. No. 13/117,918, entitled "Systems and Methods for Powering a Network Access Device using Customer Premises Equipment" and filed on May 27, 2011, which is incorporated herein by reference, describes exemplary techniques for determining whether a power signal is being received from a customer premises 19.

The NAD control logic 56 is configured to control the states of the relays 52, 53 based on whether a power signal is being received from the network termination unit 22. In this regard, if the network access device 20 is not receiving a power signal from the network termination unit 22, then the NAD control logic 56 is configured to control the relays 52, 53 such that components of the network access device 20, such as the POTS splitter 42, transceivers 43, 50, and POTS signaling elements 49, 51, are bypassed (referred to herein as the "bypass state"). Specifically, the NAD control logic 56 is configured to put each of the relays 52, 53 into the open position. Thus, the POTS splitter 42, transceivers 43, 40, and POTS signaling elements 49, 51 are electrically isolated from the connections 25 and 28, and normal POTS is provided unchanged through the network access device 20. That is, upstream and downstream POTS signals and baseband POTS signaling pass through the network access device 20 via the bypass connections 57, 59 unchanged.

If, however, the network access device 20 is receiving a power signal from the network termination unit 22, then the NAD control logic 56 controls the states of the relays 52, 53 such that the POTS splitter 42 and elements 49, 51 are not bypassed (referred to herein as the "non-bypass state").
Specifically, the NAD control logic 56 is configured to put each of the relays 52, 53 into the closed position. Thus, the POTS splitter 42, the transceivers 43, 50, and the POTS signaling elements 49, 51 are electrically coupled to the connections 25 and 28 and are electrically isolated from the bypass connections 57, 59. For such scenario, baseband POTS signaling is converted into a modulated data signal having a frequency between the POTS band and the VDSL band for communication between the network access device 20 and the network termination unit 22, as is described above.

In addition, when the network access device 20 is not receiving a power signal from the network termination unit 22, the NAD control logic 56 is configured to power down or put to sleep active components of the network access device 20, such as the transceivers 43, 50. Such a mode of operation where various components are powered down and/or put to sleep shall be referred to herein as the "low power mode."

Accordingly, if the CPE 18 stops providing a power signal across the connection 28 for any reason, such as a power failure at the customer premises 19, then data communication is stopped. Specifically, the VDSL transceiver 43 is powered down or put to sleep so that communication of VDSL signals across the connection 28 is not enabled. Further, the network access device 20 is transitioned to the bypass state such that POTS signals pass through it unchanged, as described above. Thus, POTS is still provided to the CPE 18 through the network access device 20 via the bypass connections 57, 59 in the event of a power failure that prevents the network access device 20 from receiving backpower from the customer premises 19. However, while in the bypass state, there is no conversion of baseband POTS signaling such that this signaling remains near DC on the connection 28.

While the network access device 20 is in the bypass state, it is possible for the network termination unit 22 to begin providing backpower. As an example, it is possible for a power fault at the customer premises 19 to be corrected so that the network termination unit 22 can begin backpowering the network access device 20. Thus, it is possible for the network termination unit 22 to begin transmitting a power signal below 300 Hz. The presence of such power signal should cause the network access device 20 to transition from the bypass state to the non-bypass state. In response to the power signal, the NAD control logic 56 may also power up or otherwise activate the transceivers 43, 50, which can now be powered via such power signal. The mode of operation where components previously powered down or put to sleep in the low power mode are powered up or awakened shall be referred to herein as the "high power mode." In such high power mode, VDSL signals may be communicated across the connection 28 according to the graph depicted by FIG. 3.

However, if the transition from the bypass state to the non-bypass is performed in response to the presence of the power signal on the connection 28, as described above, it is possible for portions of the power signal on the connection 28 to leak through the network access device 20 to the connection 25 and ultimately to the network 15. Specifically, it takes a finite amount of time to detect the power signal and to then transition the relays 52, 53 in response to the presence of the power signal. During the transition, at least some of the power signal may pass through the network access device 20 via the bypass connections 57, 59. Such leakage is generally undesirable as it could damage components in the network 15 even if the leakage exists for only a short time.

One exemplary embodiment prevents such leakage by warning the network access device 20 of the imminent transmission of a power signal from the network termination unit 22 just before the power signal is actually transmitted from such unit 22. In response to the warning and prior to the power signal arriving at the network access device 20, the NAD control logic 56 is configured to transition the network access device 20 to the non-bypass state. Thus, the relays 52, 53 should be in the closed position when the power signal arrives at the network access device 20. That is, the bypass connections 57, 59 should be electrically isolated from the connections 25 and 28. Since there is no bypass path for the power signal by the time such signal arrives at the intermediate point 21, the power signal is prevented from leaking through the network access device 20 and damaging components of the network 15. Exemplary techniques for warning the network access device 20 of imminent transmission of the power signal will be described in more detail hereafter.

Figure 4:
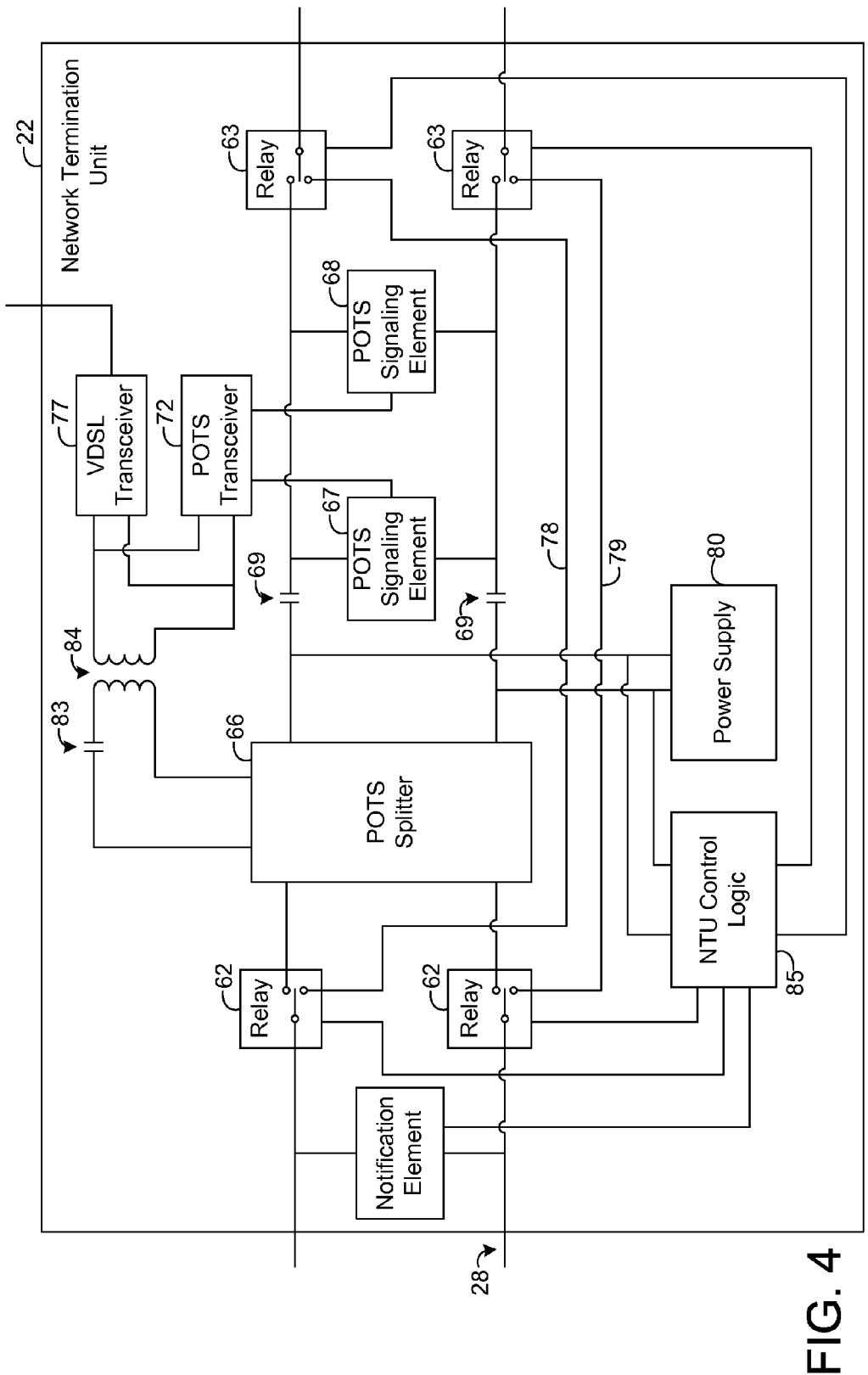
FIG. 4 is a block diagram illustrating an exemplary embodiment of a network termination unit, such as is depicted by FIG. 1.

FIG. 4 depicts an exemplary embodiment of the network termination unit 22. Like the network access device 20, the network termination unit 22 has relays 62, 63 that are used to selectively bypass components, as will be described in more detail hereafter. Similar to the network access device 20, the network termination unit 22 has a POTS splitter 66 and at least one POTS signaling element 67, 68. In addition, the network termination unit 22 has a pair of capacitors 69 for isolating the telephone 30 (FIG. 1) from the power signal that is used to backpower the network access device 20. Each relay 62 is coupled to a respective relay 63 via a bypass connection 78, 79, as shown by FIG. 4.

In the upstream direction, the POTS signaling element 67 receives baseband POTS signaling from the telephone 30 (FIG. 1) and converts such baseband POTS signaling into digital data. As shown by FIG. 4, the POTS signaling element 67 is coupled to a transceiver 72, referred to hereafter as "POTS transceiver," and the POTS signaling element 67 transmits the digital data from the baseband POTS signaling to the POT transceiver 72, which modulates a narrowband carrier signal with the digital data. In one exemplary embodiment, the narrowband carrier signal has a different frequency (e.g., 14 kHz) relative to the narrowband carrier signal transmitted in the downstream direction by the POTS transceiver 50 of FIG. 2 so that interference between the upstream and downstream narrowband signals is avoided. The POTS transceiver 72 is coupled to the connection 28 through the POTS splitter 66 and transmits the modulated data signal across the connection 28 to the network access device 20. Referring to FIG. 2, such modulated data signal is demodulated by the POTS transceiver 50 to recover the digital data, which is transmitted to the POTS signaling element 51, as described above. Thus, the network termination element 22, like the network access device 20, converts baseband POTS signaling, which in this case is from the telephone 30 (FIG. 1), to a modulated data signal at a frequency between the POTS and VDSL bands. Further, as described above, the baseband vacated by the POTS control signaling is used for transmitting a power signal from the network termination unit 22 to the network access device 20.

In the downstream direction, the POTS transceiver 72 receives the 17 kHz modulated data signal transmitted by the POTS transceiver 50 and demodulates such signal to recover digital data defining downstream POTS control signaling. As described above, such digital data is provided by the POTS signaling element 49 of FIG. 2 based on baseband POTS signaling from the connection 25. The POTS transceiver 72 of FIG. 4 is coupled to the POTS signaling element 68 and transmits the recovered digital data to such element 67, which converts the digital data into baseband POTS signaling for transmission to the telephone 30 (FIG. 1).

As shown by FIG. 4, the network termination unit 22 comprises a transceiver 77, referred to hereafter as "VDSL transceiver," that is coupled to the data communication device 31 (FIG. 1). The VDSL transceiver 77 is configured to receive data from the device 31 and to communicate such data to the network access device 20 via the connection 28. In one exemplary embodiment, the transceiver 77 is configured to transmit the data across the connection 28 via VDSL signals (e.g., VDSL2). However, other types of signals (e.g., high-speed digital subscriber line (HDSL) or other types of DSL or non-DSL signals) may be communicated by the transceivers 43, 77 in other embodiments. Though other types of signals may be communicated, it will be assumed hereafter for illustrative purposes that the transceivers 43, 77 communicate VDSL signals. Thus, in the embodiment depicted by FIG. 4, the VDSL transceiver 43 is configured to receive the VDSL signals from the transceiver 77 and to demodulate such VDSL signals to recover data that is transmitted to the optical interface 29 (FIG. 1), as described above.

In the downstream direction, the VDSL transceiver 77 receives and demodulates the VDSL signals transmitted across the connection 28 by the VDSL transceiver 43 of the network access device 20. The data recovered from such demodulation is transmitted to the data communication device 31. FIG. 1 shows a single data communication device 31 for simplicity, but there may any number of devices 31 in communication with the VDSL transceiver 77. Likewise, there may be any number of telephones 30 coupled to the POTS splitter 66.

The POTS splitter 66 is coupled to the transceivers 72, 77 through a capacitor 83 and transformer 84. The POTS splitter 66, like the POTS splitter 42 of FIG. 2, splits the energy received from the connection 28 such that low frequency signals, such as VDSL signals and baseband POTS signaling, if any, are allowed to pass to the telephone 30 while higher frequency signals, such as VDSL signals and the modulated 17 kHz signal transmitted by the network access device 20, are received by the transceivers 72, 77.

In one exemplary embodiment, the relays 62, 63 are configured similarly to the relays 52, 53 of FIG. 2 so that the network termination unit 22 is operable in a bypass state and a non-bypass state. In the non-bypass state, the relays 62, 63 are in the closed position such that the POTS splitter 66 is electrically coupled to the connection 28 via the relays 62 and to the telephone 30 (FIG. 1) via the relays 63. In such state, the relays 62, 63 electrically isolate the bypass connections 78, 79 from the connection 28, telephone 30, and components of the network termination unit 22, such as POTS splitter 66, POTS signaling elements 67, 68, and transceivers 72, 77.

In the bypass state, the relays 62, 63 are in the open position such that the POTS splitter 66, POTS signaling elements 67, 68, and transceivers 72, 77 are electrically isolated from the connection 28 and the telephone 30. In such state, each relay 62 electrically couples a respective wire of the connection 28 to a respective bypass connection 78, 79, and each relay 63 electrically couples a respective bypass connection 78, 79 to the telephone 30. Thus, POTS signals pass unchanged through the network termination unit 22 to the telephone 30 via the bypass connections 78, 79.

As shown by FIG. 4, the network termination unit 22 has a power supply 80 that is coupled to the POTS splitter 66 and provides a power signal that propagates across the connection 28 when the relays 62 are in the closed position. As described above, such power signal is received by the power conditioning element 58 (FIG. 2), which uses such power signal to provide electrical power to components of the network access device 20. The power signal from the power supply 80 may supply power toward the network access device 20 by connections made on the right side of the POTS splitter 66, as shown in FIG. 4. Alternatively, the power signal from the power supply may supply power from toward the network access device 20 by connections made on the left side of the POTS splitter 66. In one exemplary embodiment, the power signal is a direct current (DC) signal, but the power signal may be an alternating current (AC) signal in another embodiment. As an example, the power signal may be a low frequency (less than the band of the POTS signals) AC signal, but other types of power signals are possible in other embodiments. The power supply 80 may be battery powered or receive electrical power from an external wall plug or other power source.

In normal operation, the network termination unit 22 operates in the non-bypass state where the relays 62, 63 are in the closed position, and the power supply 80 transmits a power signal across the connection 28, as described above. In such state, the POTS splitter 66 and other components of the network termination unit 22 are electrically coupled to the connection 28 and to the telephone 30 (FIG. 1.).

Due to a power fault or some other condition, the power supply 80 may be prevented from providing a power signal for the network access device 20. In one exemplary embodiment, the power supply 80 is coupled to control logic 85, referred to herein as "network termination unit (NTU) control logic," that is coupled to and controls each of the relays 62, 63. The NTU control logic 85 is configured to monitor the power provided by the power supply 80. If the power supply 80 stops providing power, the NTU control logic 85 opens the relays 62, 63. That is, the NTU control logic 85 transitions the network termination unit 22 to the bypass state such that the POTS splitter 66, POTS signaling elements 67, 68, and transceivers 72, 77 are bypassed. In particular, POTS signals and baseband POTS signaling pass through the network termination unit 22 unchanged in both directions via the bypass connections 78, 79. As described above, when the power signal normally provided by the power supply 80 is not received by the network access device 20, then the network access device 20 transitions to the bypass state as well such that POTS signals and baseband POTS signaling pass unchanged through the network access device 20.

While the network termination unit 22 is in the bypass state, the NTU control logic 85 continues to monitor the power supply 80. When the power supply 80 begins to provide a power signal, the NTU control logic 85 transitions the network termination unit 22 to the non-bypass state. That is, the NTU control logic 85 closes the relays 62, 63 such that the POTS splitter 66, POTS signaling elements 67, 68, and POTS transceiver 72 are no longer bypassed by the POTS. Thus, baseband POTS signaling in the upstream direction is converted to a narrowband data signal at about 14 kHz, and a power signal is transmitted across the connection 28 from the network termination unit 22 to the network access device 20 in the vacated band, as described above.

However, before transitioning the network termination unit 22 to the non-bypass state, which will result in the power signal being transmitted across the connection 28, the NTU control logic 85 is configured to first notify the network access device 20 of the imminent transition. In response, the network access device 20 transitions to the non-bypass state just prior to the power signal appearing on the connection 28 such that leakage of the power signal through the network access device 20 is prevented, as is described further above.

There are various techniques and algorithms that may be used to notify the network access device 20 of the imminent transmission of the power signal. In one exemplary embodiment, the notification is defined by a unique POTS control signal, referred to hereafter as the "power notification signal," which is defined by 23 successive dial pulses with no inter-digit break. In other embodiments, other types of power notification signals may be used.

When the NAD control logic 56 detects the power notification signal on the connection 28, the NAD control logic 56 transitions the network access device 20 to the non-bypass state and then transmits a handshake signal to the network termination unit 22 to acknowledge receipt of the power notification signal. In response to such handshake signal, the network termination unit 22 begins to transmit the power signal across the connection 28 to the network access device 20. Specifically, the NTU control logic 85 closes the relays 62, 63 in order to transition the network termination unit 22 to the non-bypass state. When the relays 62 are in such state, the power signal provided by the power supply 80 propagates across the connection 28 to the network access device 20. Since the network access device 20 has been transitioned to the non-bypass state before the handshake signal is transmitted to the network termination unit 20 and, hence, transmission of the power signal, the relays 52, 53 (FIG. 2) are closed when the power signal from the network termination unit 22 begins to arrive at the network access device 20, and the network access device 20 effectively isolates the power signal from the network 15. In this regard, due to the state of the relays 52, 53 the power signal is prevented from bypassing the circuitry of the network access device 20, and the capacitors 44 (FIG. 2) prevent the power signal from propagating across the connection 25 to the network 15.

Thus, the system 12 provides simultaneous POTS and high-speed data transmission across the connection 28 while also using the connection 28 to backpower the network access device 20 from the customer premises 19. The system 12 further allows POTS to flow through the network access device 20 and the network termination unit 22 unchanged when a power failure prevents the network termination unit 22 from providing backpower to the network access device 20. Furthermore, the network access device 20 may be initially installed and used with a conventional network termination unit (not shown) that is not configured to provide backpower. In such case, the NAD control logic 56 does not detect the presence of a suitable power signal on the connection 28 and, thus, keeps the network access device 20 in the bypass state. In such case, the network access device 20 delivers POTS similar to the situation described above when there is a power failure that prevents the network termination unit 22 from backpowering. Accordingly, the network access device 20 is compatible with conventional network termination units.

If the customer later upgrades to a network termination unit 22 that is configured for backpowering, as described above, then the NAD control logic 56 automatically transitions to a combined POTS and VDSL solution without requiring a truck roll to the intermediate point 21. That is, in response to detection of a suitable power signal or power signal notification on the connection 28, the NAD control logic 56 transitions the network access device 20 from the bypass state to the non-bypass state so that POTS and VDSL can be simultaneously provided across the connection 28.

An exemplary operation and use of the system 12 will now be described with particular reference to FIG. 5.

Assume that the network access device 20 is installed between a network 15 and a customer premises 19, as shown by FIG. 1. After power up, the NAD control logic 56, which receives power from the power conditioning element 60, initially places the network access device 20 into the bypass state, as shown by block 118 of FIG. 5. In particular, the NAD control logic 56 opens the relays 52, 53 such that the POTS signaling elements 49, 51, transceivers 43, 50 and POTS splitter 42 are electrically isolated from the connections 25 and 28. In such case, VDSL service is not provided since the VDSL transceiver 43 is electrically isolated from the connections 25 and 28. To conserve power, the NAD control logic 56 puts the network access device 20 into a low power state by not providing power or putting to sleep various components, such as the POTS signaling elements 49, 51 and transceivers 43, 50, as shown by block 122 of FIG. 5. While the network access device 20 is in the bypass state, POTS passes through the device 20 unchanged via the bypass connections 57, 59, which are electrically coupled to the connections 25, 28 by the relays 52, 53.

Figure 5:
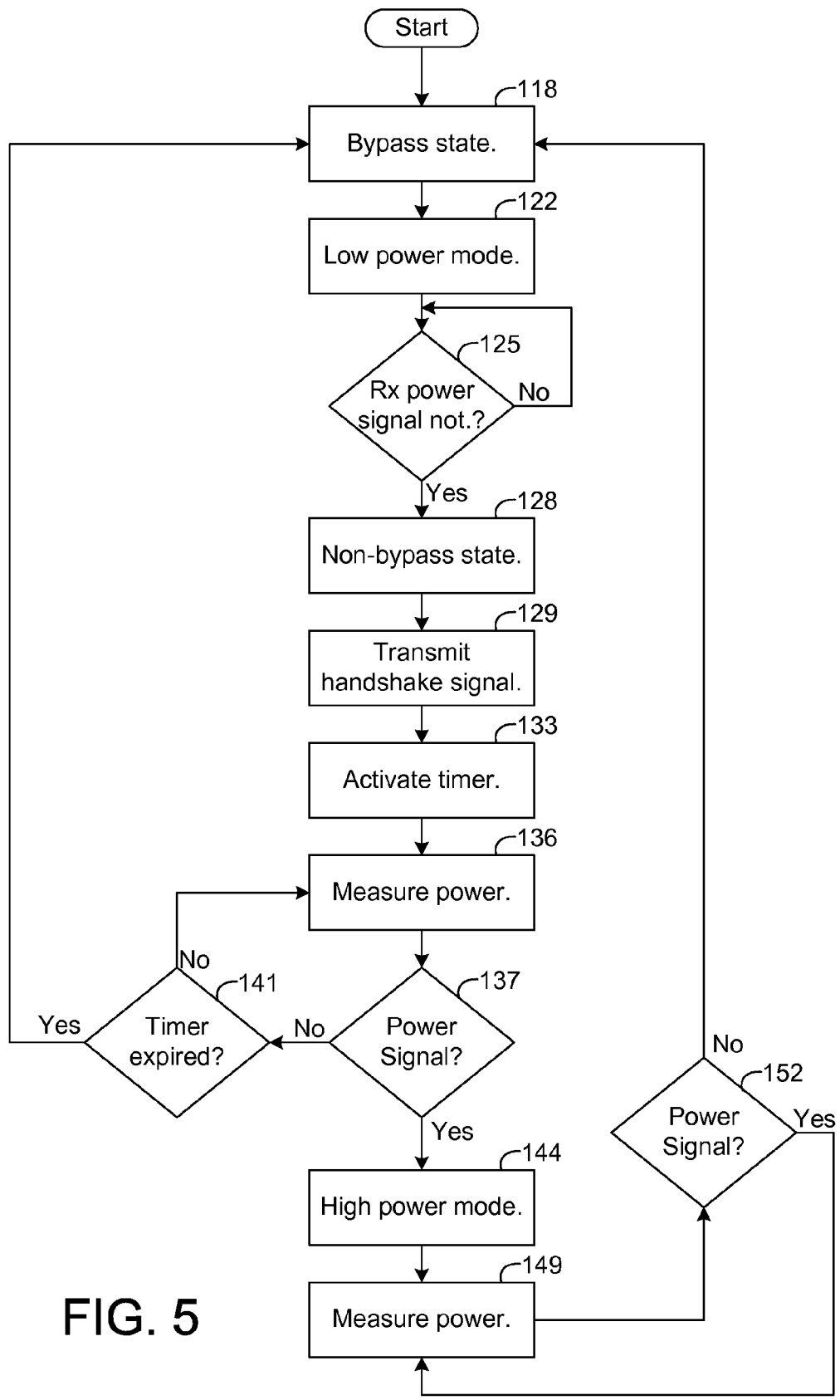
FIG. 5 is a flow chart illustrating an exemplary operation and use of a network access device, such as is depicted by FIG. 1.

While the network access device 20 remains in the bypass state, the NAD control logic 56 monitors the connection 28 for a power signal notification from the network termination unit 22, as shown by block 125 of FIG. 5. As described above, the network termination unit 22 transmits such signal once it is ready to begin transmitting the power signal across the connection 28. Once the power signal notification is received, the NAD control logic 56 transitions the network access device 20 to the non-bypass state by closing the relays 52, 53, as shown by block 128 of FIG. 5. The NAD control logic 56 also transmits a handshake signal across the connection 28 in order to acknowledge reception of the power signal notification, as shown by block 129 of FIG. 5.

The NAD control logic 56 then activates a timer (not shown), as shown by block 133 of FIG. 5. Such timer may be implemented in hardware or software and is set to expire a short time after activation thereby indicating a reasonable time period for the network access device 20 to receive the power signal from the network termination unit 22 after sending the handshake signal in block 129. As shown by blocks 136, 137 of FIG. 5, the NAD control logic 136 measures a value indicative of power for tip 54 and ring 55 to determine whether a power signal is being received from the network termination unit 22. If the power signal is not received before expiration of the timer, then the NAD control logic 56 assumes that a problem at the customer premises 19 has prevented the network termination unit 22 from providing the power signal as expected. In such case, the NAD control logic 56 transitions back to the bypass state, as shown by blocks 141, 118 of FIG. 5.

However, if the power signal is received before expiration of the timer such that a "yes" determination in made in block 137, then the NAD control logic 56 transitions the network access device 20 from the low power state to a high power state, as shown by block 144 of FIG. 5, by powering up or awakening the components previously powered down or put to sleep in block 122.

Thereafter, the NAD control logic 56 continues to measure values indicative of power for tip 54 and ring 55 to determine whether a power signal is being received from the network termination unit 22, as shown by blocks 149 and 152 of FIG. 5. If each measured value indicates that a power signal is being received, then network termination unit 22 is providing at least a desired amount of power for powering active components of the network access device 20 and/or other components at the intermediate point 21. In such case, the NAD control logic 56 keeps the network access device 20 in the non-bypass state. Thus, POTS and high-speed VDSL service are provided both upstream and downstream, and there is also a low frequency (below at least about 300 Hz) power signal transmitted from the network termination unit 22 to the network access device 20.

For illustrative purposes, assume that a power fault at the customer premises 19 prevents the network termination unit 22 from transmitting the low frequency power signal across the connection 28. In such case, the measured power value should indicate that a power signal is not being received by the network access device 20 from the network termination unit 22 causing the NAD control logic 56 to put the network access device 20 into the bypass state, as shown by blocks 118, 152 of FIG. 5. Noting that the network termination unit 22 is also put into the bypass state if it is unable to provide a suitable power signal across the connection 28, the baseband POTS signaling occurs near DC on connections 25, 28 since the components for converting the baseband POTS signaling to higher frequency data signals are bypassed. Once transitioned to the bypass state, the NAD control logic 56 transitions the network access device 20 to the low power mode, as shown by block 122, by powering down or putting to sleep various components, such as the POTS signaling elements 49, 51 and transceivers 43, 50. The NAD control logic 56 also monitors the connection 28 for a power signal notification from the network termination unit 22, as shown by block 125 of FIG. 5, and repeats the process described above once a power signal notification is received.

Thus, when a power signal is being received from the network termination unit 22, the network access device 20 should generally operate in the non-bypass state and the high power mode. Otherwise, the network access device 20 should generally operate in the bypass state and the lower power mode.

In embodiments that transmit a low-frequency power signal (e.g., less than about 300 Hz) across the connection 28, it is possible for the power conditioning element 58 to introduce noise to the POTS signals. In an effort to protect the POTS band starting at around 300 Hz from noise, larger-size inductors may be used to implement the power conditioning element 58. In one exemplary embodiment, the POTS signals are digitized so that inductor sizes of the power conditioning element 58 may be reduced.

Figure 6:
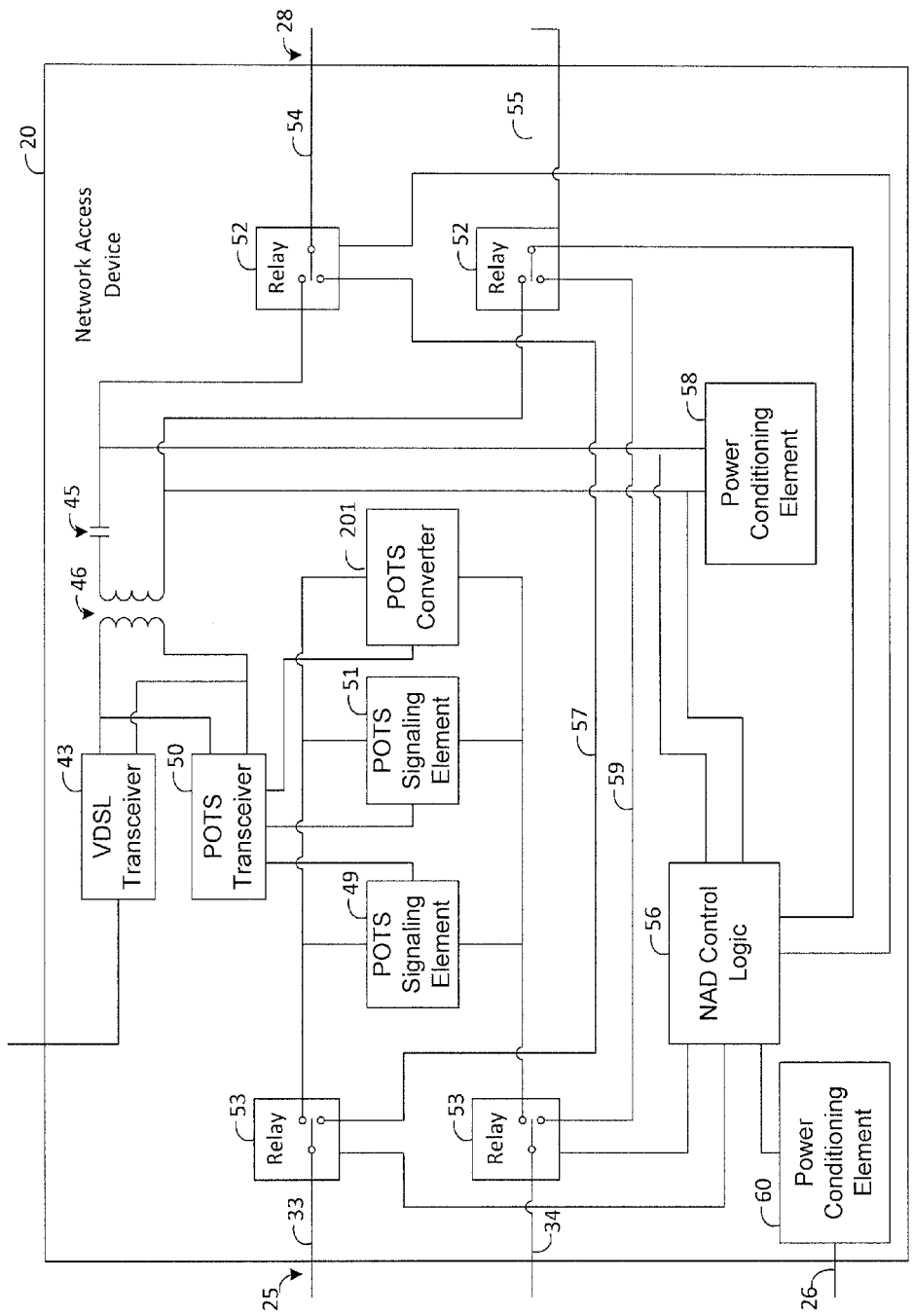
FIG. 6 is a block diagram illustrating an exemplary embodiment of a network access device, such as is depicted by FIG. 1.

FIG. 6 depicts an exemplary embodiment of the network access device 20 in which a POTS converter 201 is configured to digitize POTS signals. Except as otherwise described hereafter, the network access device 20 of FIG. 6 operates the same as the network access device 20 of FIG. 2. As shown by FIG. 6, the POTS converter 201 is coupled to tip 33 and ring 34 of the connection 25 and receives from tip 33 and ring 34 downstream POTS signals in the 300 Hz to 4 kHz band. The POTS converter 201 converts such POTS signal into digital data and sends the digital data to the POTS transceiver 50, which modulates a carrier signal with the digital data in order to communicate the digital data across the connection 28.

As an example, the data defining the POTS signals may be transmitted in the same narrowband of around 17 kHz that is used to communicate the baseband POTS signaling. Alternatively, the data defining the POTS signals my be transmitted in another narrowband, such as about 10 kHz. In other embodiments, other frequency ranges may be used.

Accordingly, the POTS signals are effectively moved from a band starting around 300 Hz to a band that starts much higher than 300 Hz. Doing so takes the frequency of the POTS signals on the connection 28 further away from the frequency of the power signal so that smaller inductors may be used by the power conditioning element 58 without introducing a significant amount of noise in the POTS signals. Notably, since the POTS signals are digitized, it is unnecessary for the connection 25 to be coupled to the connection 28 through the network access device 20. Thus, the POTS splitter 42 and capacitors 44 shown by FIG. 2 are omitted in the embodiment depicted by FIG. 6.

Figure 7:
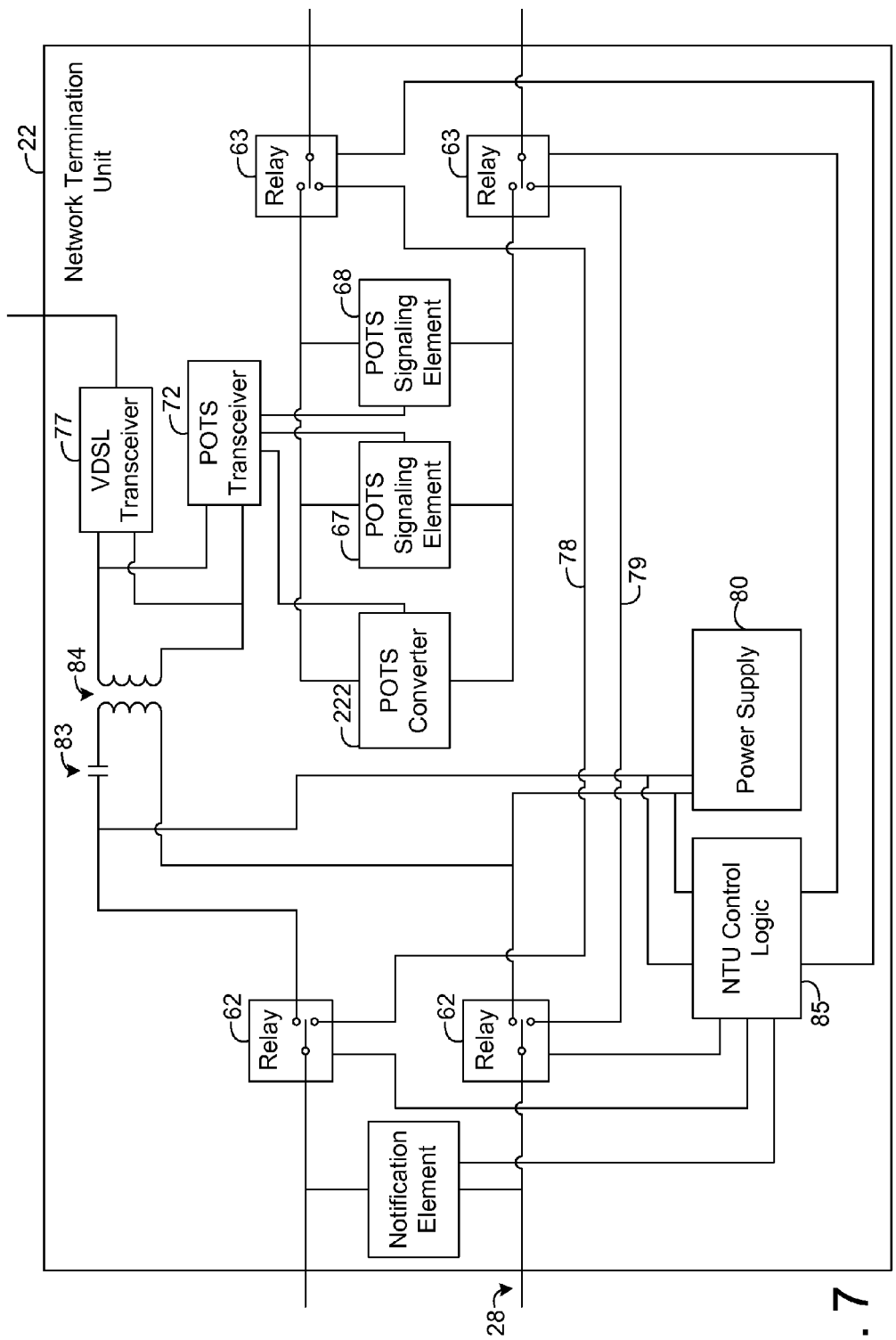
FIG. 7 is a block diagram illustrating an exemplary embodiment of a network termination unit, such as is depicted by FIG. 1.

FIG. 7 depicts an exemplary embodiment of the network termination unit 22 that may be used in conjunction with the network access device 20 shown by FIG. 6. Except as otherwise described hereafter, the network termination unit 22 of FIG. 7 operates the same as the network termination unit 22 of FIG. 4. Referring to FIG. 7, the POTS transceiver 72 receives modulated data signals from the connection 28 and recovers, from such signals, the data defining the downstream POTS signals digitized by the network access device 20. Such data is sent to the POTS converter 222, which re-creates the POTS signals originally digitized by the network access device 20. That is, the POTS converter 222 converts such data into analog signals having a frequency between about 300 Hz and 4 kHz and transmits such analog signals to the telephone 30 (FIG. 1).

In the upstream direction, POTS signals from the telephone 30 are received by the POTS converter 222, which converts such signals into digital data. Such digital data is provided to the POTS transceiver 72, which modulates a carrier signal with the data similar to how the POTS transceiver 50 modulates a carrier signal with POTS data from the POTS converter 201 in the downstream direction. Thus, the POTS data is transmitted upstream across the connection 28, and the POTS transceiver 50 (FIG. 6) recovers the POTS data. The POTS transceiver 50 sends the POTS data to the POTS converter 201 (FIG. 6), which converts the POTS data to analog signals in the POTS band between about 300 Hz to about 4 kHz.

Figure 8:
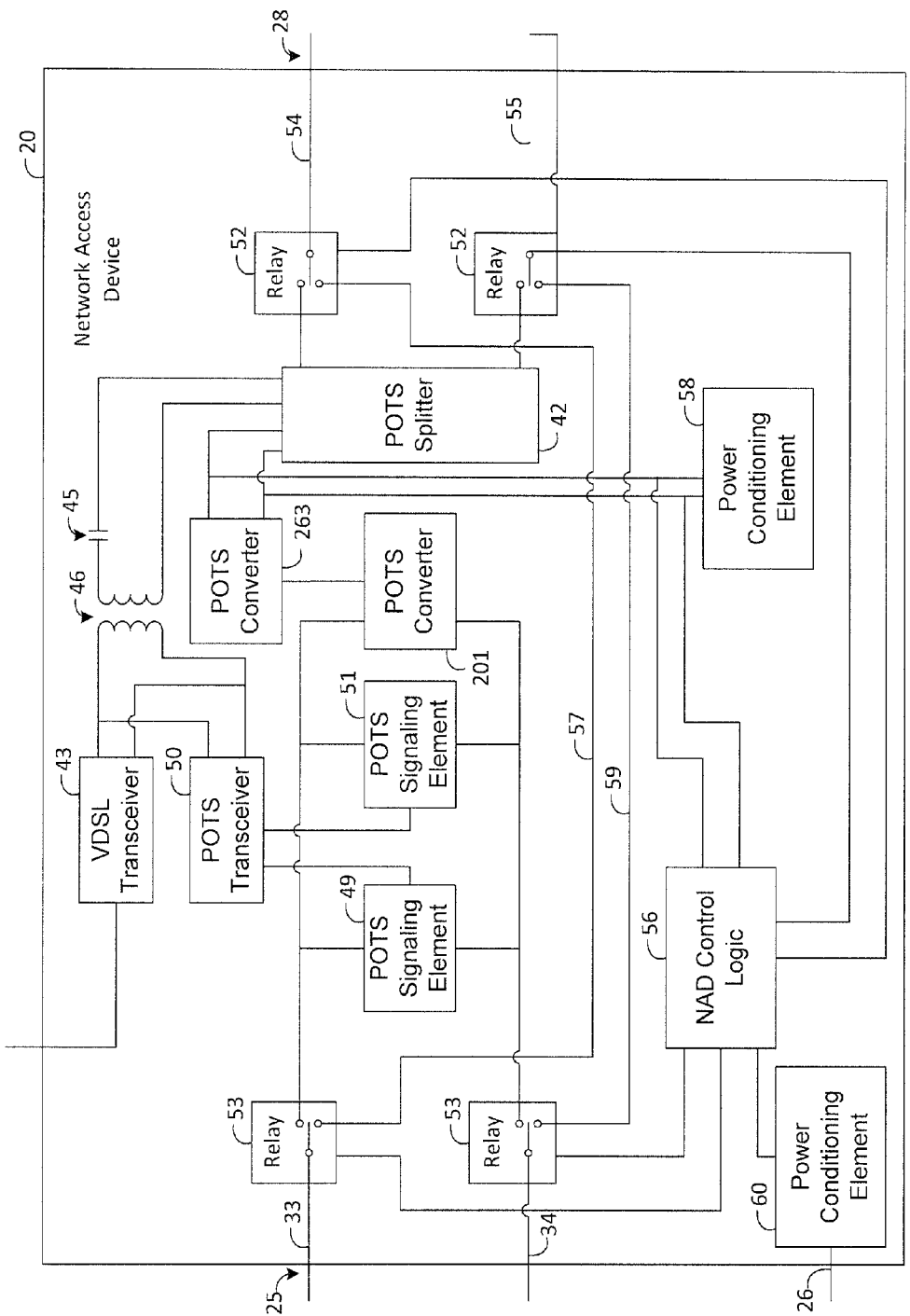
FIG. 8 is a block diagram illustrating an exemplary embodiment of a network access device, such as is depicted by FIG. 1.

FIG. 8 depicts an exemplary embodiment of the network access device 20 for an embodiment similar to the one shown by FIG. 6. Except as otherwise described hereafter, the network access device 20 of FIG. 8 operates the same as the network access device 20 of FIG. 6. As shown by FIG. 8, the POTS converter 201 is coupled to a POTS converter 263 that receives the POTS data defining the POTS signals received from the connection 25. The POTS converter 263 is configured to convert such digital data into analog signals in a frequency range starting higher than about 300 Hz. As an example, the POTS converter may transmit analog signals in a frequency range of about 3 kHz to about 7 kHz, although other frequency ranges are possible in other embodiments. Thus, the POTS band is effectively moved to a higher frequency range thereby providing more separation between the POTS band and the frequency of the power signal. In the embodiment, depicted by FIG. 8, the POTS splitter 42 operates as it does in the embodiment depicted by FIG. 2 by separating the POTS signals (which are now in a higher frequency range) from the higher frequency signals, such as VDSL and the narrowband signals carrying the baseband POTS signaling.

In the upstream direction, the POTS converter 263 receives POTS signals, which may be in a frequency range starting higher than about 300 Hz if the network termination unit 22 is similarly configured to move POTS signals to a higher frequency range. The POTS converter 263 is configured to convert the analog POTS signals into digital data and to transmit such digital data to the POTS converter 201, which re-creates the POTS signals originally received by the network termination unit 22 from the telephone 30 (FIG. 1). That is, the POTS converter 201 converts the digital data into analog POTS signals in a frequency range between about 300 Hz and 4 kHz for transmission across the connection 25.

Figure 9:
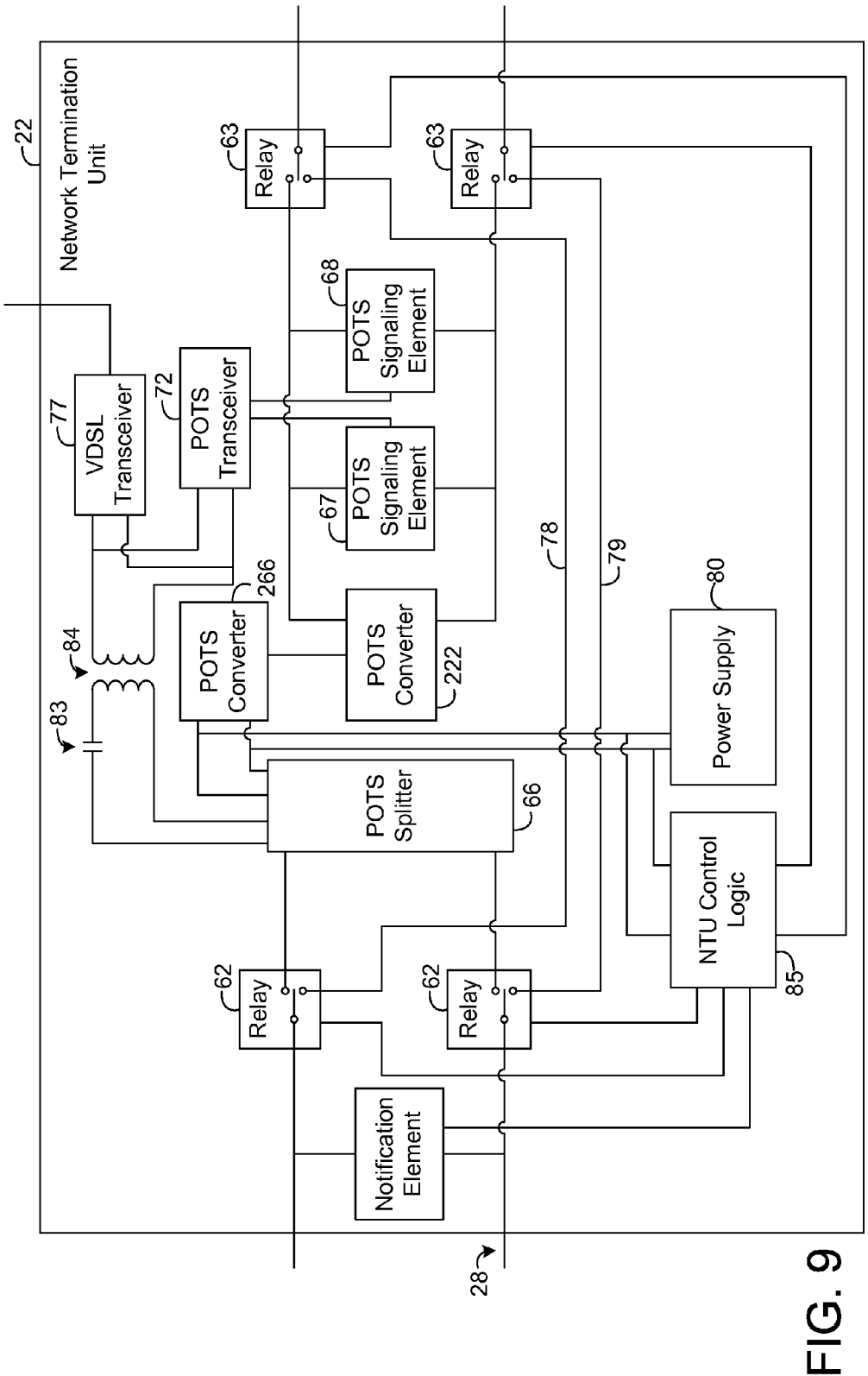
FIG. 9 is a block diagram illustrating an exemplary embodiment of a network termination unit, such as is depicted by FIG. 1.

FIG. 9 shows an exemplary embodiment of the network termination unit 22 that may be used in conjunction with the network access device 20 of FIG. 8. As shown by FIG. 9, a POTS converter 266 is coupled between the POTS splitter 66 and the POTS converter 222. The POTS converter 222 transmits to the POTS converter 266 digital data defining POTS signals in the upstream direction, and the POTS converter 266 converts such digital data into analog signals having a frequency range starting at a frequency greater than about 300 Hz, such as a frequency range between about 3 kHz and about 7 kHz. Thus, the upstream POTS signals are moved to a higher frequency range for communication across the connection 28.

In the downstream direction, the POTS converter 266 receives analog POTS signals in the frequency range transmitted by the POTS converter 263 (FIG. 8). The POTS converter 266 converts such analog signals into digital data and transmits the digital data to the POTS converter 222, which re-creates the POTS signals originally received by the network access device 20 from the network 15. That is, the POTS converter 222 converts the digital data into analog POTS signals in a frequency range between about 300 Hz and about 4 kHz for transmission to the telephone 30 (FIG. 1).

In another exemplary embodiment, a high-frequency AC power signal is transmitted across the connection 28 from the network termination unit 22 to the network access device 20. Such AC signal is preferably transmitted at an otherwise unused frequency higher than the POTS band (i.e., higher than about 4 kHz), such as around 10 kHz. In such an embodiment, the POTS signal elements 49, 51, POTS transceiver 50, and capacitors 44 may be omitted since there would be no need to vacate the baseband. Further, without the presence of the POTS signaling elements 49, 51 to be selectively bypassed, the relays 52, 53 may be omitted as well. In such embodiment, the connection 28 is electrically coupled to the connection 25 through the POTS splitter 42, which allows POTS signals and baseband POTS signaling to pass while blocking the higher-frequency power signal. In such embodiment, the power conditioning element 58 is preferably coupled to tip 54 and ring 55. Further, the NAD control logic 56 may be configured to power down and power up the VDSL transceiver 43 based on whether a power signal is being received from the network termination unit 22. Since the power signal is blocked by the POTS splitter 42, there is no need to warn the network access device 20 of the imminent transmission of the power signal, as is described above. Similarly, the POTS signaling elements 67, 68, POTS transceiver 72, capacitors 69, and relays 62, 63 may be omitted from the network termination unit 22.

In such embodiment, the power supply 80 is preferably coupled to the connection 28 on the network side of the POTS splitter 66.

Now, therefore, the following is claimed:

1. A network access device coupled between a network and customer premises equipment (CPE) at a customer premises, comprising:
   a first transceiver configured to transmit, across a subscriber line extending to the customer premises equipment (CPE), a first data signal modulated with a data stream received from the network via a first network connection;
   a plain old telephone system (POTS) signaling element configured to receive baseband POTS signaling from the network via a second network connection, the POTS signaling element configured to convert the baseband POTS signaling to digital data;
   a second transceiver configured to transmit across the subscriber line a second data signal modulated with the digital data, the second data signal having a frequency between a band for analog POTS signals and a band for the first data signal;
   a first relay coupled to the subscriber line at a point between the POTS signaling element and the CPE;
   a second relay coupled to the second network connection at a point between the POTS signaling element and the network;
   a bypass connection coupled to the first and second relays;
   a power conditioning element configured to receive a direct current (DC) power signal from the CPE via the subscriber line and to power at least one of the first and second transceivers based on the DC power signal; and
   control logic configured to detect the DC power signal and to control the first and second relays such that the baseband POTS signaling is selectively transmitted from the second network connection to the subscriber line via the bypass connection, thereby selectively bypassing the POTS signaling element, based on the detected DC power signal.

2. The network access device of claim 1, wherein the control logic is configured to receive a notification from the CPE and to transition the network access device to a non-bypass state from a bypass state in response to the notification, wherein the first relay electrically couples the bypass connection to the subscriber line in the bypass state, wherein the second relay electrically couples the bypass connection to the second network connection in the bypass state, and wherein the first relay electrically isolates the bypass connection from the subscriber line in the non-bypass state.

3. The network access device of claim 1, further comprising a POTS converter configured to receive the analog POTS signals from the second network connection and to convert the POTS signals to digital data.

4. A network access device, comprising:
   a first transceiver coupled to a subscriber line, the first transceiver configured to receive a data stream from a first network connection and modulate a first carrier signal with the data stream to form a first modulated data signal, the first transceiver configured to transmit the first modulated data signal across the subscriber line;
   a plain old telephone system (POTS) signaling element coupled to a second network connection, the POTS signaling element configured to receive baseband POTS signaling from the second network connection and to convert the baseband POTS signaling to digital data;
   a second transceiver coupled to the subscriber line and configured to modulate a second carrier signal with the digital data thereby forming a second modulated data signal, the second transceiver configured to transmit the second modulated data signal across the subscriber line, the second modulated data signal having a frequency between a band for analog POTS signals and a band for the first modulated data signal;
   a power conditioning element configured to receive a direct current (DC) power signal from the subscriber line and to power at least one component of the network access device via the DC power signal; and
   control logic configured to control the network access device such that the POTS signaling element is selectively bypassed by the baseband POTS signaling based on the DC power signal.

5. The network access device of claim 4, further comprising a POTS splitter coupled to the subscriber line and second network connection, wherein POTS signals from the second network connection simultaneously propagate across the subscriber line along with the first and second modulated data signals and the DC power signal.

6. The network access device of claim 4, further comprising a POTS converter configured to receive POTS signals from the second network connection and to convert the POTS signals into digital data.

7. The network access device of claim 4, further comprising:
   a first relay coupled to the second network connection at a point between the POTS signaling element and a network from which the baseband POTS signaling is transmitted; and
   a bypass connection coupled to the first relay and to the subscriber line,
   wherein the control logic is configured to control the first relay such that the POTS signaling element is selectively bypassed by the baseband POTS signaling based on the DC power signal.

8. The network access device of claim 7, further comprising a second relay coupled to the subscriber line and the bypass connection, wherein the control logic is configured control the first and second relays such that the bypass connection is electrically coupled to the subscriber line and the second network connection simultaneously for permitting the baseband POTS signaling to bypass the POTS signaling element.

9. The network access device of claim 7, wherein the control logic is configured to control the first relay such that the second network connection is electrically isolated from the POTS signaling element and electrically coupled to the bypass connection in response to a determination that the network access device has stopped receiving the DC power signal.

10. The network access device of claim 9, wherein the control logic is configured to receive a notification from a remote device coupled to the subscriber line and to control the first relay such that the second network connection is electrically coupled to the POTS signaling element and electrically isolated from the bypass connection in response to the notification.

11. The network access device of claim 10, wherein the notification is defined by baseband POTS signaling from the remote device.

12. A communication system, comprising:
customer premises equipment having a network termination unit;
a subscriber line coupled to the network termination unit; and
a network access device coupled to the network termination unit via the subscriber line, the network access device configured to receive a data stream from a first network connection and to transmit across the subscriber line a first data signal modulated with the data stream, the network access device configured to receive plain old telephone system (POTS) signals and baseband POTS signaling from a second network connection and to convert the baseband POTS signals into digital data, the network access device configured to transmit across the subscriber line a second data signal modulated with the digital data, the second data signal having a frequency between a band for the POTS signals and a band for the first data signal, the network access device further configured to receive a direct current (DC) power signal transmitted across the subscriber line simultaneously with the first data signal and the second data signal, wherein the network access device is configured to power at least one component of the network access device based on the DC power signal.

13. The system of claim 12, wherein the network access device has a transceiver coupled to the subscriber line and configured to transmit the second data signal, and wherein the network access device has control logic configured to control the network access device such that the POTS signaling element is selectively bypassed by the baseband POTS signaling based on the DC power signal.

14. The system of claim 13, wherein the network access device comprises:
a first relay coupled to the second network connection; and
a bypass connection coupled to the first relay and to the subscriber line,
wherein the control logic is configured to control the first relay such that the POTS signaling element is selectively bypassed by the baseband POTS signaling based on the DC power signal.

15. A method, comprising:
receiving a data stream from a network via a first network connection;
modulating a first carrier signal with the data stream thereby forming a first modulated data signal;
receiving baseband plain old telephone system (POTS) signaling from the network via a second network connection;
converting the baseband POTS signaling to digital data via circuitry residing at an intermediate point between the network and customer premises equipment (CPE) coupled to a subscriber line;
modulating a second carrier signal with the digital data thereby forming a second modulated data signal, the second modulated data signal having a frequency between a band for analog POTS signals and a band for the first modulated data signal;
simultaneously transmitting the first and second modulated data signals across the subscriber line to the CPE;
receiving a direct current (DC) power signal from the CPE via the subscriber line;
powering at least one component at the intermediate point based on the DC power signal; and
selectively bypassing the circuitry with the baseband POTS signaling based on the DC power signal.

16. The method of claim 15, further comprising receiving the analog POTS signals from the network via the second network connection.

17. The method of claim 16, further comprising transmitting signals across the subscriber line based on the analog POTS signals.

18. The method of claim 15, wherein the bypassing comprises controlling, based on the DC power signal, a first relay coupled to the second network connection and a bypass connection that is coupled to the subscriber line.

19. The method of claim 18, further comprising determining when the intermediate point stops receiving the DC power signal, wherein the controlling comprises transitioning the first relay such that the second network connection is electrically isolated from the circuitry and electrically coupled to the bypass connection in response to determining that the intermediate point has stopped receiving the DC power signal.

20. The method of claim 19, further comprising:
receiving a notification from the CPE via the subscriber line, the notification indicating that transmission of the DC power signal across the subscriber line is imminent; and
transitioning the first relay such that the second network connection is electrically coupled to the circuitry and electrically isolated from the bypass connection in response to the notification.

21. The method of claim 18, wherein the bypassing comprises controlling, based on the DC power signal, a second relay coupled to the subscriber line and the bypass connection.

22. The method of claim 21, wherein the first relay is coupled to the second relay via the bypass connection.

23. The method of claim 15, wherein the simultaneously transmitting comprises simultaneously transmitting the first and second modulated data signals and analog POTS signals from the second network connection across the subscriber line to the CPE.

24. The method of claim 15, further comprising:
receiving from the CPE a notification that transmission of the DC power signal from the CPE is imminent; and
in response to the notification, causing the circuitry to receive the baseband POTS signaling and to perform the converting.

25. The method of claim 15, wherein a bandwidth of the baseband POTS signaling overlaps a bandwidth of the DC power signal and is less than 300 Hertz.

26. The network access device of claim 1, wherein the POTS signaling element is coupled between the first relay and the second relay.

27. The network access device of claim 4, further comprising a POTS splitter coupled to the first and second transceivers, wherein the subscriber line is coupled to the second network connection via the POTS splitter such that analog POTS signals from the second network connection are carried by the subscriber line simultaneously with the first and second modulated signals.

28. The network access device of claim 4, wherein the control logic is configured to receive from the CPE a notification that transmission of the DC power signal to the network access device is imminent, and wherein the control logic is further configured to control the network access device in response to the notification such that the baseband POTS signaling is received by the POTS signaling element.

29. The network access device of claim 4, wherein a bandwidth of the baseband POTS signaling overlaps a bandwidth of the DC power signal and is less than 300 Hertz.

30. The network access device of claim 1, wherein the control logic is configured to power down the first transceiver and the second transceiver in response to a determination that the network access device has stopped receiving the DC power signal.

31. A network access device coupled between a network and customer premises equipment (CPE) at a customer premises, comprising:
 at least one transceiver configured to transmit simultaneously, across a subscriber line extending to the customer premises equipment (CPE), a first data signal and a second data signal, the first data signal modulated with a data stream received from the network via a first network connection;
 a plain old telephone system (POTS) signaling element configured to receive baseband POTS signaling from the network via a second network connection, the POTS signaling element configured to convert the baseband POTS signaling to digital data, wherein the second data signal is modulated with the digital data and has a frequency between a band for analog POTS signals and a band for the first data signal;
 at least one relay coupled to the subscriber line and the second network connection;
 a bypass connection coupled to the at least one relay;
 a power conditioning element configured to receive a direct current (DC) power signal from the CPE via the subscriber line and to power at least one component of the network access device based on the DC power signal; and
 control logic configured to detect the DC power signal and to control the at least one relay, in response to a detection of an absence of the DC power signal on the subscriber line, such that the baseband POTS signaling and an analog POTS signal are transmitted across the bypass connection and the subscriber line thereby bypassing the POTS signaling element, the control logic further configured to control the at least one relay, when the DC power signal is present on the subscriber line, such that the second network connection is isolated from the subscriber line by the at least one relay thereby preventing the DC power signal from passing through the network access device to the second network connection.

32. The network access device of claim 31, wherein the at least one relay includes a first relay and a second relay, the first relay coupled to the second network connection and the bypass connection, the second relay coupled to the subscriber line and the bypass connection, wherein the control logic is configured to control the first and second relays, when the DC power signal is present on the subscriber line, such that the second network connection and the subscriber line are isolated from the bypass connection by the first and second relays.

33. The network access device of claim 31, wherein the control logic is configured to transition the at least one relay from a bypass state to a non-bypass state in response to a notification from the CPE that transmission of the DC power signal from the CPE is imminent, wherein the subscriber line is electrically coupled to the second network connection by the bypass connection when the at least one relay is in the bypass state, and wherein the second network connection is isolated from the subscriber line by the at least one relay when the at least one relay is in the non-bypass state.

34. The network access device of claim 31, further comprising a POTS splitter coupled to the at least one transceiver, wherein the subscriber line is coupled to the second network connection via the POTS splitter such that analog POTS signals from the second network connection are carried by the subscriber line simultaneously with the first and second data signals.

35. The network access device of claim 1, wherein the control logic is configured to control the first and second relays, when the DC power signal is present on the subscriber line, such that the second network connection and the subscriber line are isolated from the bypass connection by the first and second relays.

36. The network access device of claim 1, wherein the control logic is configured to control the first and second relays to selectively connect and disconnect the bypass connection from the subscriber line and the second network connection based on the detected DC power signal such that the bypass connection is connected to the subscriber line and the second network connection in response to a determination that the network access device has stopped receiving the DC power signal.

37. The network access device of claim 2, wherein the control logic is configured to receive the notification from the CPE when the DC power signal is absent from the subscriber line, and the notification from the CPE indicates that the CPE is ready to transmit the DC power signal to the network access device.

38. The network access device of claim 4, further comprising:
 a first relay coupled to the second network connection;
 a second relay coupled to the subscriber line;
 a bypass connection coupled to the first and second relays; and
 wherein the control logic is configured to control the first and second relays, when the DC power signal is present on the subscriber line, such that the second network connection and the subscriber line are isolated from the bypass connection by the first and second relays.

39. The system of claim 12, wherein the network access device comprises:
 a first relay coupled to the second network connection;
 a second relay coupled to the subscriber line;
 a bypass connection coupled to the first and second relays;
 control logic configured to control the first and second relays, when the DC power signal is present on the subscriber line, such that the second network connection and the subscriber line are isolated from the bypass connection by the first and second relays.

40. The method of claim 15, wherein the selectively bypassing the circuitry includes:
 controlling a first relay that is coupled to the second network connection and a bypass connection and a second relay that is coupled to the subscriber line and the bypass connection to selectively bypass the circuitry with the baseband POTS signaling via the bypass connection based on the DC power signal; and
 controlling the first and second relays such that the second network connection and the subscriber line are isolated from the bypass connection by the first and second relays when the DC power signal is present on the subscriber line.

41. The network access device of claim 31, wherein control logic is configured to control the at least one relay such that the at least one relay prevents the baseband POTS signaling from reaching the POTS signaling element in response to the detection of the absence of the DC power signal on the subscriber line.

42. The network access device of claim 1, wherein the control logic is configured to control the second relay such that the second relay (1) electrically couples the second network connection to the bypass connection and electrically isolates the second network connection from the POTS signaling element in a bypass state and (2) electrically couples the second network connection to the POTS signaling element and electrically isolates the second network connection from the bypass connection in a non-bypass state.

43. The method of claim 18, wherein the first relay is coupled to the second network connection at a point between circuitry and the network such that the second network connection is electrically isolated from the circuitry when the circuitry is bypassed by the baseband POTS signaling.

* * * * *